US005426585A

United States Patent [19]

Stepper et al.

[11] Patent Number: 5,426,585

[45] Date of Patent: Jun. 20, 1995

[54] METHOD AND APPARATUS FOR GENERATING CALIBRATION INFORMATION FOR AN ELECTRONIC ENGINE CONTROL MODULE

[75] Inventors: Mark R. Stepper, Columbus; Ernest F. Grube, Indianapolis; Gregory R. White, Columbus, all of Ind.; Vernon M. Faulkner, Tierra Verde, Fla.; Ronald B. Lannan, Columbus, Ind.; Ralph M. Weaver, Indianapolis, Ind.; Michele S. Roberts, Indianapolis, Ind.; Phillip E. Pash, Indianapolis, Ind.

[73] Assignee: Cummins Electronics Company, Inc., Columbus, Ind.

[21] Appl. No.: 890,652

[22] Filed: May 28, 1992

Related U.S. Application Data

[63] Continuation of Ser. No. 677,142, Mar. 29, 1991, abandoned.

[51] Int. Cl.[6] .............................................. G06F 15/20

[52] U.S. Cl. .......................... 364/424.03; 364/431.03; 395/600

[58] Field of Search ...................... 364/431.03, 431.04, 364/431.12, 424.03, 424.04; 395/500, 600

[56] References Cited

U.S. PATENT DOCUMENTS

| | | | |
|---|---|---|---|
| 4,404,639 | 9/1983 | McGuire et al. | 364/424.04 |
| 4,623,976 | 11/1986 | Carp et al. | 364/571.07 |
| 4,677,558 | 6/1987 | Böhmler et al. | 364/431.04 |
| 4,751,633 | 6/1988 | Henn et al. | 364/431.12 X |
| 4,796,206 | 1/1989 | Boscove et al. | 364/551.01 |
| 4,908,792 | 3/1990 | Przybyla et al. | 364/431.12 |
| 4,991,101 | 2/1991 | Ishikawa | 364/431.04 X |
| 5,062,038 | 10/1991 | Jordan, Jr. | 395/650 |
| 5,093,779 | 3/1992 | Sakurai | 395/600 |

OTHER PUBLICATIONS

Cummins Document, PACE Subsystem Design Specification, Jan. 1988, 57 pages.

Cummins Document, PACE Technical Package, Jun. 1987, pp. 4–15.

Cummins Document, PACE Software, 83 pages No date.

Stamper, "A Second-Generation Approach to Service of Electronic Systems," SAE Technical Paper Series No. 891681, Future Transportation Technology Conference and Exposition, Vancouver, BC, Canada, Aug. 7–10, 1989.

Lannan et al., "Cummins Electronic Controls for Heavy Duty Diesel Engines," *IEEE* 88 CH2533-8, International Congress on Transportation Electronics, Convergence 88, Dearborn, Michigan, Oct. 17–18, 1988.

*Primary Examiner*—Thomas G. Black
*Assistant Examiner*—Collin W. Park
*Attorney, Agent, or Firm*—Woodard, Emhardt, Naughton, Moriarty & McNett

[57] ABSTRACT

A method and apparatus for generating calibration information in which a subfile type is defined for each of a plurality of categories of data including (1) engine control data, (2) engine family data, (3) vehicle interface data, (4) software sequencing data, (5) electronic configuration data, and (6) memory configuration data. A separate subfile is created in memory for each of a plurality of individual sets of data in each of the data categories. Each subfile is automatically provided with line checksums, a cyclic redundancy code, date information, a subfile type identifier, and a subfile authorization level, and data entries are automatically verified base on rules stored in memory in a rules file, each of the subfile types having an associated rules file, and each of the rules files defining criteria for individual data items and for interrelationships between data items in its associated subfile type. A compatibility file is created in memory to identify subfiles of one type which are compatible with a subfile of another type. Each subfile and the compatibility file are distributed individually via an electronic communication link to multiple service computers programmed to determine compatibility among selected subfiles based on information stored in the compatibility file and to assemble compatible subfiles into a calibration file for a particular engine control module.

23 Claims, 3 Drawing Sheets

METHOD AND APPARATUS FOR GENERATING CALIBRATION INFORMATION FOR AN ELECTRONIC ENGINE CONTROL MODULE

CROSS-REFERENCE TO RELATED APPLICATION

This application is a continuation of U.S. Pat. application Ser. No. 07/677,142, filed on Mar. 29, 1991, entitled METHOD AND APPARATUS FOR GENERATING CALIBRATION INFORMATION FOR AN ELECTRONIC ENGINE CONTROL MODULE, now abandoned.

BACKGROUND OF THE INVENTION

This invention relates to electronic engine control systems, and more particularly to systems and methods of calibration of electronic engine control systems.

Field-programmable electronic engine control systems have enabled product enhancements to be made at a greatly reduced cost. One generic control module can be reprogrammed for many different applications, e.g., different engine ratings, without any changes to the physical configuration of the module. This concept is discussed in a paper by Lannan et al. entitled "Cummins Electronic Controls for Heavy Duty Diesel Engines," IEEE 88 CH2533-8, presented at tile International Congress on Transportation Electronics, Convergence 88, Dearborn, Michigan, Oct. 17–18, 1988, and in a paper by Stamper entitled "A Second Generation Approach to Service of Electronic Systems," SAE Paper No. 891681, presented at the Future of Transportation Technology Conference and Exposition, Vancouver, British Columbia, Canada, Aug. 7–10, 1989.

Various memory organization techniques have been suggested, making use of RAM, EPROM, EEPROM, or NVRAM, as illustrated by the following patents:

| Patent No. | Inventor | Issue Date |
|---|---|---|
| 4,677,558 | Bohmler et al. | Jun. 30, 1987 |
| 4,751,633 | Henn et al. | Jun. 14, 1988 |
| 4,908,792 | Przybyla et al. | Mar. 13, 1990 |

While field programmability is recognized as a highly desirable feature, there remains a need for more efficient and secure techniques for distributing new software, as well as a need for improved techniques for generating software to support new engine ratings and the like.

SUMMARY OF THE INVENTION

The present invention overcomes these and other disadvantages of the prior art with a method and apparatus for generating calibration information in which a subfile type is defined for each of a plurality of categories of data, and a separate subfile is created in memory for each of a plurality of individual sets of data in each of the data categories. Each subfile is automatically assembled, with data entries automatically verified based on rules stored in memory in a rules file. A compatibility file is created in memory to identify subfiles of one type which are compatible with a subfile of another type. Each subfile and the compatibility file are distributed individually via an electronic communication link to multiple service computers programmed to determine compatibility among selected subfiles based on information stored in the compatibility file and to assemble compatible subfiles into a calibration file for a particular engine control module.

It is a general object of this invention to provide an improved method and apparatus for generating calibration information for an electronic engine control module.

A further object of the invention is to provide an improved technique for generation of software to support changes in engine ratings and the like.

Yet another object of tile invention is to provide an improved system of distributing control module software to the field.

These and other objects and advantages of the present invention will be more apparent upon reading the following detailed description of the preferred embodiment in conjunction with the accompanying drawings.

DESCRIPTION OF THE PREFERRED EMBODIMENT

Figure 1:
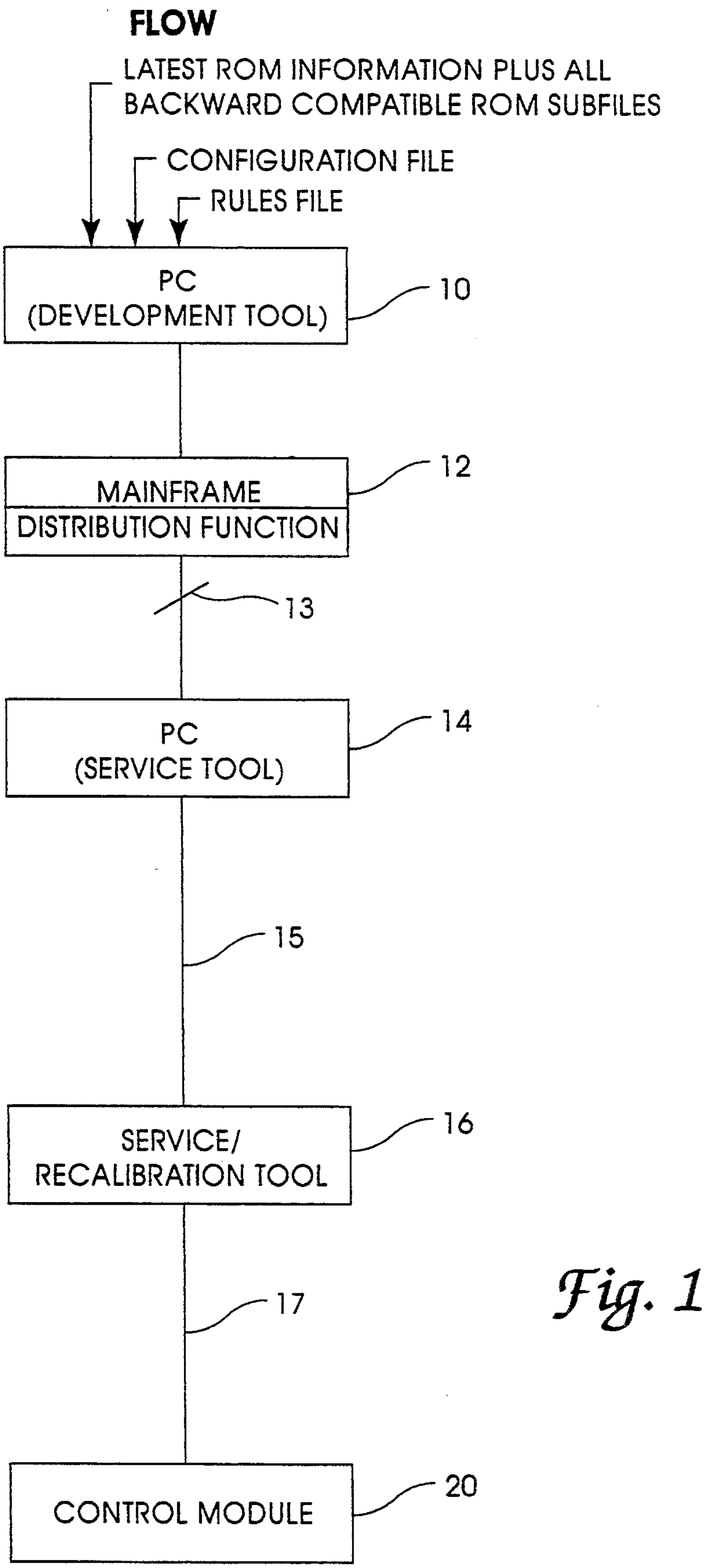
FIG. 1 is a block diagram illustrating the development and distribution of calibration files according to the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, a software development tool 10, which may be a personal computer (PC), is used to develop subfiles which are used to form a file of application-specific calibration information for an electronic control module (ECM) 20. Each ECM 20 contains a ROM, which stores the primary executable code for control of the ECM, and an EEPROM, which is divided into a ROM-independent area and a ROM-dependent area, and which is programmed remotely with the calibration information via a serial data link.

The subfiles mentioned above are developed in conjunction with the development of new or changed engine or fuel system ratings and, according to one aspect of the present invention, are directly generated by engine developers or fuel system developers without the involvement of software engineers. For example, in the case of a new engine torque requirement, an engine developer develops new torque curve data and, through the development tool, reprograms an ECM with the new data and then performs engine tests with the reprogrammed ECM to validate the changes.

The development tool uses a configuration file to determine how to change data in the control module. The configuration file contains information about each item in the control module that can be monitored or calibrated and provides the information that defines the compatibility situation for items in the calibration. More specifically, the file contains a record which defines, first of all, how to label the data: A unique 8-character name is assigned to each piece of data. The record also defines how to scale and display data. That is, it specifies the number of bytes per data item, the units to be associated with the data, the decimal location when the data is printed, the scaling information directly or indirectly, and the level of authorization needed to change the data.

The configuration file also identifies whether the data desired is available. Each data item record has information about the version of control module and/or calibration in which it is available. This record provides support for backward compatibility. The file provides the user with text information for each data item to describe its meaning.

Two- or three-dimensional tables are identified by several records in the configuration file. These records can be associated with a particular Y or Z data table and then displayed for the user. Several key table characteristics are defined by these records:

1) X and/or Y axis breakpoint tables;
2) Y and/or Z data tables (surface data);
3) X, Y and Z scaling information which can normalize different data ranges to one range for display. For example, 0–255 can correspond to 0–3000 RPM. The normalized range can be scaled with information from the configuration file to cover the desired range for the particular type of data.

The configuration file also defines how to group records into subfile types and how to group records pertaining to one function. Subfile grouping puts data pertaining to a specific engine rating or other engine control data into one subfile type while other data such as that which is specific to an electronic dash or other vehicle interface data would be grouped into different subfile type. Each record contains information which allows it to be grouped with one specific function. For example, one group might be for all of the records in the configuration file associated with cruise control. One group can contain information that can be monitored and calibrated.

The authorization level for each item in the file is also defined. This gives each item a unique user-authorization level require before a user can change the data item.

The ability to support many revisions of one product through the use of one configuration file is an important concept. One of the major goals of this strategy is that all revisions of the product be backward compatible with all previous records in a configuration file.

A CRC assures the integrity of the configuration file before it is used by the software development tools. If the check passes, the file is available for use; otherwise, no operation by the tool can be performed.

Subfiles are created using a unique file format with line checksums and a complete file cyclic redundancy check. They are also provided with time and date information taken from the configuration file. This information is later used to determine what versions of control module are supported by this subfile. Also embedded in the subfiles are an indicator of subfile type and a subfile authorization level.

Subfiles are released only if the data contained in them pass checks made regarding formal guidelines and if the data pass rule checks that verify the data values and interrelationships between data items within one subfile. Some data items are set to default values before release.

Subfiles are uploaded to a mainframe computer 12 in an engine manufacturing plant or design facility after verification that they can be assembled with other subfiles to make a complete calibration. Once a subfile has been through this process, it is marked accordingly and the subfile authorization level is set. Subfiles are labeled with a seven-digit part number and then encoded (compacted for upload) prior to upload to the mainframe. Subfiles uploaded to the mainframe are accompanied with appropriate release documentation, a manual paperflow process.

Several operations are performed on the subfiles uploaded to the mainframe and, once available for release, the subfiles are distributed via phone lines 13 or otherwise to various locations such as engineering, service, manufacturing and end-customer sites. First, compatibility information must be defined and a determination made of what subfiles can be put together to form a calibration for a given engine family (10 liter, 14 liter) and engine rating (350 horsepower at 2100 rpm). The compatibility information must be pulled together, put into a file and distributed to PCs 14 at end-customer and service locations. These compatibility files are downloaded to customer PCs on a regular basis reflecting the latest configurations available. The files are distributed to the appropriate authorization level locations. Some files may only be used for field test, experimental or developmental reasons. Only the latest revision of a subfile is normally available. To retrieve an older revision, special action must be taken.

Figure 2:
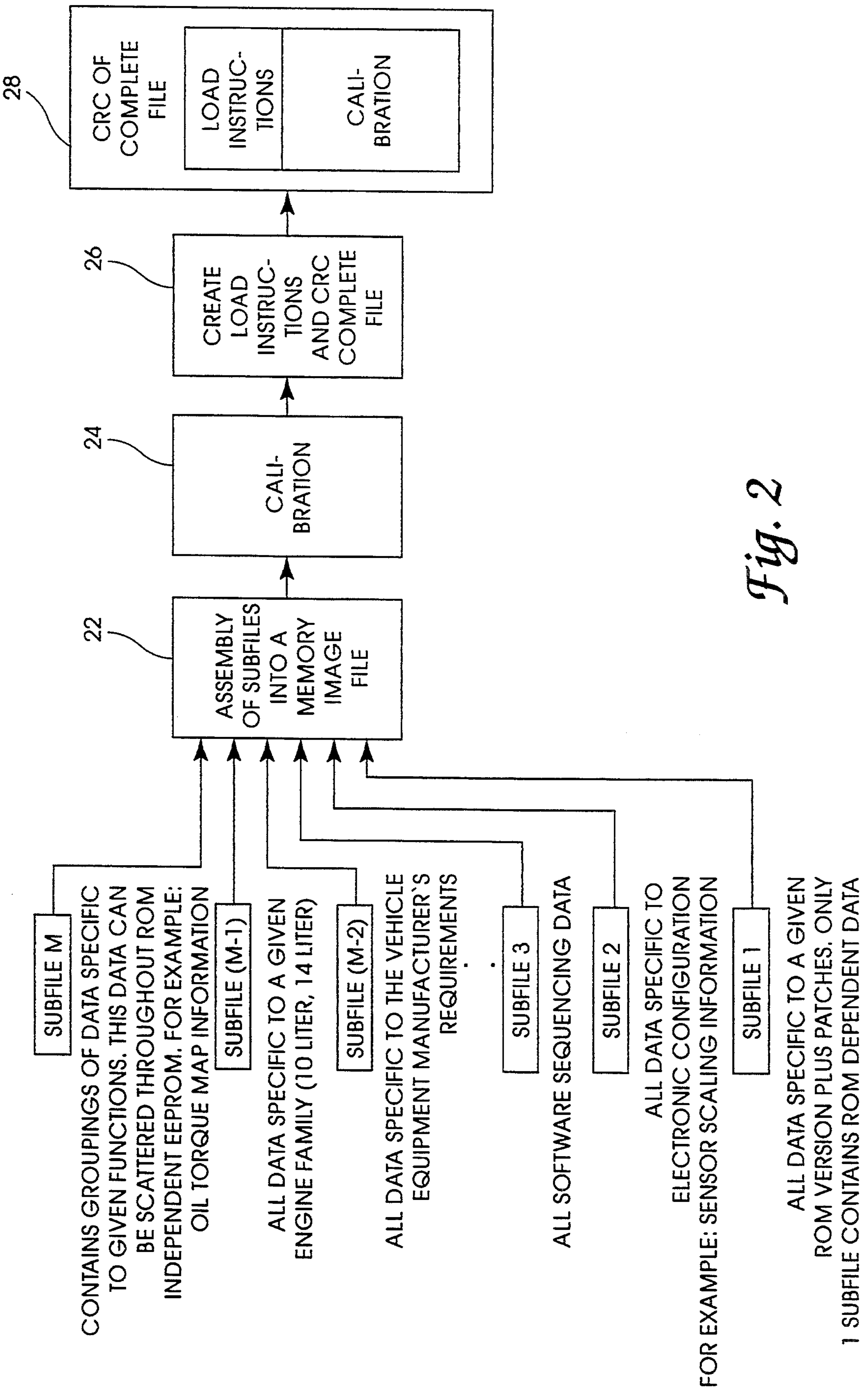
FIG. 2 is a block diagram illustrating the calibration file and subfile relationship for the preferred embodiment of the present invention.

File security and protection against accidental and/or intentional changes are provided in several ways. The following methods of protection are for those files residing in storage on a service PC 14. First, files encoded before distribution to the PC are put in a download directory and decoded. Once a received file has been verified by decoding and checking its CRC and authorization level, the file is stored in a predetermined product directory in PC 14. FIG. 2 shows six types of subfiles which correspond to the following categories of data:

| Subfile type | Category of data |
|---|---|
| N | engine control data |
| N - 1 | engine family data |
| N - 2 | vehicle interface data |
| 3 | software sequencing data |
| 2 | electronic configuration data |
| 1 | memory configuration data |

The configuration file used to create files for upload is not available for service locations at predefined authorization level. Therefore, the PC software that performs the editing function is not supplied to this predefined authorization level user. These two situations make it extremely difficult for people at service locations to tamper with the data in these files.

The file formats used have been uniquely designed for this application. They contain unique record types defined for this application, and twos complement line checksums for each line of the file. Date stamps help determine compatibility with control module ROM re]eases. This information is also used to verify that a given set of files is capable of being assembled together to form a calibration. All subfiles must fall inside the range of dates associated with a given control module ROM release in order to be assembled together. File type identifiers are used to associate rules files for verification of the data in a particular subfile and to assure that one each of the required file types is used in an assembled calibration. Subfiles are encapsulated with a custom CRC checksum. A unique algorithm is used to complete the CRC attached to each file. These CRCs are checked prior to allowing the file to be used.

The calibration assembler software in the service computer 14 performs many checks to verify an assembled calibration file. The calibration file is left available for use only if all the checks pass successfully. The calibration assembler attaches calibration loading instructions for an associated service/recalibration tool 16 to use. The process is illustrated in FIG. 2: PC 14 assembles subfiles (block 22) to form a calibration (block 24), adding load instructions (block 26) to produce a complete file (block 28). Calibration files created by the calibration assembler are not stored for future use. Each assembly process clears the previous result to assure that if a particular calibration is desired it will be assembled with the latest revision level of subfiles. Only the latest revision level of subfiles are available on the PC. The file format for the calibration file is based on a unique format that is expected by the service/recalibration tool. The file is also encapsulated by a CRC checksum. The calibration file format used for files being sent to the service/recalibration tool contains the following characteristics:

1) CRC over the entire file;
2) ASCII decimal data which relays the control module loading instructions; and
3) binary data representing the calibration data to be put into the control module memory.

The calibration file is transferred over an RS232 connection 15 from service PC 14 to service/recalibration tool 16. At the end of the transfer, the service/recalibration tool verifies the process by validating the CRC on the calibration file received. The tool checks the calibration file format (CRC, load instructions and calibration data), as well as the control module ID. If the CRC is validated, the process was successful.

The service/recalibration tool is connected to control module 20 via data link 17 when the control module is to be calibrated or recalibrated. Tool 17 programs the control module using SAE J1708 data link interface standard and a unique protocol. The protocol employs a 10-character security handshake that changes for each secure message. The recalibration tool and the ECM are provided with matching security algorithms designed to prevent the deciphering of the security scheme simply by monitoring data link messages. According to the algorithms, the passwording is modulated by a continuously changing value which, therefore, produces a password that appears different for each secure control module operation. In order for the control module to perform the requested operation, the security algorithm checks must pass. Also, per-message checksums must be valid. In addition, specific control module loading instructions must be followed to calibrate the control module successfully. EEPROM validation checks are also performed.

One of the important operating assumptions the service/recalibration tool follows is that it will only correct control module EEPROM checksum errors if it knows why they exist. If the reason is not known, the correction will not be attempted. The procedure includes the following steps:

1) check control checksum;
2) install footprint;
3) processes header records (part 1);
4) load calibration data;
5) process header records (part 2);
6) verify every byte of calibration data in the control module with that in the recalibration tool; and
7) clear the footprint.

The above Header Records provide the capability for the calibration assembly tools to give instructions to be used during calibration load of control module. The first level of record defines whether the operation should be performed on all, first time calibration loads or on non first time initial loads. The next level of record indicates how the particular header record should be used. These uses include:

Save and Restore—This means the calibration loading tool should read a given set of information from the control module before loading the calibration and then restore this information after the process is complete. Example uses of this record type are for control module serial number, engine serial number, vehicle identification information, etc.

Update after calibration load—This record is used to program in some information after the calibration has been loaded into the control module. Example uses of this record are to store the calibration part numbers into an electronic data plate, reset specific nonvolatile memory information such as engine run time, etc.

Compare for equal, not equal, greater than, or less than—The compare capability allows for certain checks to be performed before the calibration is loaded into the control module. These checks can use the logic expressions just mentioned to So checks before loading calibrations possibly to limit the calibration to be able to be used with one specific control module and engine serial number.

The calibration header records have a third level record which identifies how many times a specific calibration is allowed to be loaded. This capability allows the calibration assembly device to specify how many times a specific calibration can be loaded before the file should be destroyed.

The procedure attempts to minimize the chance of a control module failure caused by an invalid EEPROM which is the result of a failed recalibration procedure. This is done by inserting an identifier (footprint) into EEPROM at the start of the EEPROM change process. Then if the process is interrupted, the service/recalibration tool recognizes that it is the device performing the changes and will recalibrate the control module to correct the situation. The footprint is stored in a nonchecksummed area of nonvolatile memory.

The control module in the uncalibrated state delivered from the supplier must have a factory test pattern which is used to verify that the module passed the pertinent factory tests. If for some reason a factory test fails, the control module will not be loaded with the factory test pattern. Therefore, when the calibration loading device begins its process to calibrate tile control module, it will verify that either the test pattern or a calibration loading device footprint is there before it will attempt to perform its process of recalibration. This process puts a valid calibration and checksum into the control module.

The control module will perform checks on its EEPROM memory to see if it may be used. The control module will not correct its own EEPROM checksum if it is in error. This ensures that the control module has a valid EEPROM at all times. If for some reason EEPROM changes and the checksum becomes invalid, the control module will not allow the engine to run from a poweron condition.

Figure 3:
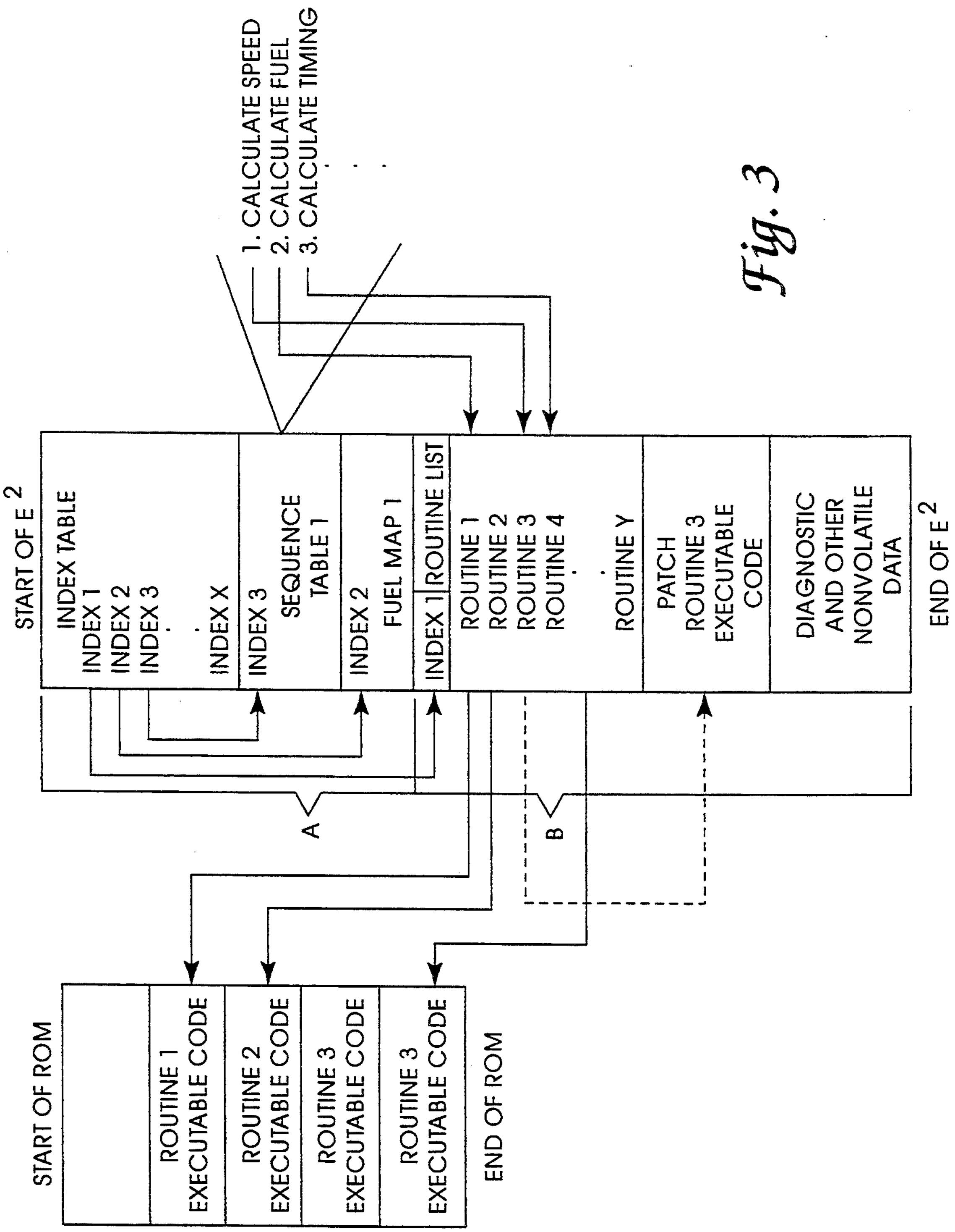
FIG. 3 illustrates the memory organization in an engine control module for the preferred embodiment of the present invention.

Referring now to FIG. 3, the memory in the ECM includes a ROM 30 and an EEPROM 32, with the EEPROM divided as shown into a ROM-independent area and a ROM-dependent area. The ROM contains a number of stored routines which can be addressed by a microprocessor (not shown) based on pointers stored in corresponding routine lists in the EEPROM. The EEPROM includes an index table containing pointers to corresponding locations elsewhere in the EEPROM, either in a ROM-independent area A (sequence table 1 and fuel map 1) or in a ROM-dependent area B (routine list, patch, and diagnostic and other nonvolatile data). Functions or data in the EEPROM are addressed from ROM-based routines by reference to an index table location assigned to store the address of the desired function or data. Similarly, addresses of memory locations in the routine list are contained in memory locations in a sequence table, whereby routines residing in ROM can be executed in a desired order, such as routine 3, 1 and then 4 in the example of FIG. 3.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method of generating calibration information for an electronic engine control module, comprising the steps:

defining a subfile type for each of a plurality of categories of data including (1) engine control data, (2) engine family data, (3) vehicle interface data, (4) software sequencing data, (5) electronic configuration data, and (6) memory configuration data;

creating a separate subfile in memory for each of a plurality of individual sets of data in each of said data categories, said creating step including automatically providing each subfile with line checksums, a cyclic redundancy code, date information, a subfile type identifier, and a subfile authorization level; and automatically verifying data entries based on rules stored in memory in a rules file, each of said subfile types having an associated rules file, each of said rules files defining criteria for individual data items and for interrelationships between data items in its associated subfile type;

creating a compatibility file in memory identifying subfiles of one type which are compatible with a subfile of another type;

distributing each subfile and said compatibility file individually via an electronic communication link to a plurality of service computers programmed to determine compatibility among selected subfiles based on information stored in said compatibility file and to assemble compatible subfiles into a calibration file for a particular engine control module; and generating calibration information for said particular engine control module from said calibration file.

2. The method of claim 1, further comprising the steps:

providing said engine control module with a ROM containing multiple stored routines and an EEPROM divided into a ROM-independent area and a ROM-dependent area, said ROM-independent area containing an index table and a sequence table, said ROM-dependent area containing a routine list and a patch area for a substitute for one of said stored routines, said index table containing pointers to locations in said ROM-independent area and in said ROM-dependent area, said sequence table containing pointers to locations in said routine list, and said routine list containing pointers to locations in said ROM; and loading said calibration information selectively into said ROM-independent and ROM-dependent areas of said EEPROM in said engine control module.

3. The method of claim 2, wherein said loading step includes supplying a security handshake that changes for each of a plurality of secure messages.

4. The method of claim 3, wherein said loading step further includes initially installing a footprint into a nonvolatile memory in said engine control module, processing header records, and verifying the calibration file data in said engine control module with that in the service computer used for said loading step, said processing of header records including storing a calibration part number into an electronic data plate in said nonvolatile memory.

5. The method of claim 4, wherein said loading step further includes preliminarily verifying the presence of either a predetermined test pattern of a footprint from a prior loading operation in memory in said engine control module.

6. The method of claim 1, further comprising the step:

loading said calibration information into said engine control module; said loading step including supplying a security handshake that changes for each of a plurality of secure messages.

7. The method of claim 1, further comprising the step:

loading said calibration information into said engine control module, said loading step including initially installing a footprint into a nonvolatile memory in said engine control module, processing header records, and verifying the calibration file data in said engine control module with that in the service computer used for said loading step, said processing of header records including storing a calibration part number into an electronic data plate in said nonvolatile memory.

8. The method of claim 1, further comprising the step:

loading said calibration information into said engine control module, said loading step including preliminarily verifying the presence of either a predetermined test pattern or a footprint from a prior loading operation in memory in said engine control module.

9. A method of generating calibration information for an electronic engine control module, comprising the steps:

defining a subfile type for each of a plurality of categories of engine calibration data;

creating a separate subfile in memory for each of a plurality of individual sets of data in each of said engine calibration data categories, said creating step including automatically verifying data entries based on rules stored in memory in a rules file, each of said subfile types having an associated rules file, each of said rules files defining criteria for individual data items and for interrelationships between data items in its associated subfile type;

creating a compatibility file in memory identifying subfiles of one type which are compatible with a subfile of another type;

distributing each subfile and said compatibility file individually via an electronic communication link to a plurality of service computers programmed to determine compatibility among selected subfiles based on information stored in said compatibility file and to assemble compatible subfiles into a calibration file for a particular engine control module;

providing said engine control module with a ROM containing multiple stored routines and an EEPROM divided into a ROM-independent area and a ROM-dependent area, said ROM-independent area containing an index table and a sequence table, said ROM-dependent area containing a routine list and a patch area for a substitute for one of said stored routines, said index table containing pointers to locations in said ROM-independent area and in said ROM-dependent area, said sequence table containing pointers to locations in said routine list, and said routine list containing pointers to locations in said ROM;

generating calibration information for said particular engine control module from said calibration file; and loading said calibration information selectively into said ROM-independent and ROM-dependent areas of said EEPROM in said engine control module.

10. A method of generating calibration information for an electronic engine control module, comprising the steps:

defining a subfile type for each of a plurality of categories of engine calibration data;

creating a separate subfile in memory for each of a plurality of individual sets of data in each of said engine calibration data categories, said creating step including automatically verifying data entries based on rules stored in memory in a rules file, each of said subfile types having an associated rules file, each of said rules files defining criteria for individual data items and for interrelationships between data items in its associated subfile type;

creating a compatibility file in memory identifying subfiles of one type which are compatible with a subfile of another type;

distributing each subfile and said compatibility file individually via an electronic communication link to a plurality of service computers programmed to determine compatibility among selected subfiles based on information stored in said compatibility file and to assemble compatible subfiles into a calibration file for a particular engine control module;

generating calibration information for said particular engine control module from said calibration file; and loading said calibration information into said engine control module, said loading step including supplying a security handshake that changes for each of a plurality of secure messages.

11. A method of calibrating an electronic engine control module, comprising the steps:

providing a first computer with a separate subline for each of a plurality of individual sets of data in each of a plurality of engine calibration data categories;

providing said first computer with a compatibility file identifying subfiles of one type which are compatible with a subfile of another type;

assembling a calibration file in said first computer from compatible subfiles based on information stored in said compatibility file;

attaching calibration loading instructions to said calibration file in said first computer;

transferring said calibration file with attached calibration loading instructions to a service/recalibration tool at a remote location; and calibrating said electronic engine control module through said service/calibration tool, said calibrating step including loading data from said calibration file in said service/recalibration tool into said electronic engine control module under control of said service/recalibration tool following said calibration loading instructions attached to said calibration file.

12. A system for generating calibration information for an electronic engine control module, comprising:

means for defining a subfile type for each of a plurality of categories of data including (1) engine control data, (2) engine family data, (3) vehicle interface data, (4) software sequencing data, (5) electronic configuration data, and (6) memory configuration data;

means for creating a separate subfile in memory for each of a plurality of individual sets of data in each of said data categories, said creating means including means for automatically providing each subfile with line checksums, a cyclic redundancy code, date information, a subfile type identifier, and a subfile authorization level; and means for automatically verifying data entries based on rules stored in memory in a rules file, each of said subfile types having an associated rules file, each of said rules files defining criteria for individual data items and for interrelationships between data items in its associated subfile type;

means for creating a compatibility file in memory identifying subfiles of one type which are compatible with a subfile of another type;

means for distributing each subfile and said compatibility file individually via an electronic communication link to a plurality of service computers programmed to determine compatibility among selected subfiles based on information stored in said compatibility file and to assemble compatible subfiles into a calibration file for a particular engine control module;

engine control module memory including a ROM containing multiple stored routines and an EEPROM divided into a ROM-independent area and a ROM-dependent area, said ROM-independent area containing an index table and a sequence table, said ROM-dependent area containing a routine list and a patch area for a substitute for one of said stored routines, said index table containing pointers to locations in said ROM-independent area and in said ROM-dependent area, said sequence table containing pointers to locations in said routine list, and said routine list containing pointers to locations in said ROM; and service/recalibration tool means for generating calibration information for a particular engine control module from said calibration file a loading said calibration information selectively into said ROM-independent and ROM-dependent areas of said EEPROM in said engine control module, said service/recalibration tool means including means for supplying a security handshake that changes for each of a plurality of secure messages, means for initially installing a footprint into said EEPROM, means for processing header records, and means for verifying the calibration file data in said EEPROM with that in said service/recalibration tool means, said processing means including means for storing a calibration part number into an electronic data plate in said EEPROM, said service/recalibration tool means further including means for preliminarily verifying the presence of either a predetermined test pattern or a footprint from a prior loading operation in said EEPROM.

13. A system for generating calibration information for an electronic engine control module, comprising:

means for defining a subfile type for each of a plurality of categories of data including (1) engine control data, (2) engine family data, (3) vehicle interface data, (4) software sequencing data, (5) electronic configuration data, and (6) memory configuration data;

means for creating a separate subfile in memory for each of a plurality of individual sets of data in each of said data categories, said creating means including means for automatically providing each subfile with line checksums, a cyclic redundancy code, date information, a subfile type identifier, and a subfile authorization level; and means for automatically verifying data entries based on rules stored in memory in a rules file, each of said subfile types having an associated rules file, each of said rules files defining criteria for individual data items and for interrelationships between data items in its associated subfile type;

means for creating a compatibility file in memory identifying subfiles of one type which are compatible with a subfile of another type;

means for distributing each subfile and said compatibility file individually via an electronic communication link to a plurality of service computers programmed to determine compatibility among selected subfiles based on information stored in said compatibility file and to assemble compatible subfiles into a calibration file for a particular engine control module; and means for generating calibration information for said particular engine control module from said calibration file.

14. The system of claim 13, further comprising:

means for programming an engine control module having a ROM containing multiple stored routines and an EEPROM divided into a ROM-independent area and a ROM-dependent area, said ROM-independent area containing an index table and a sequence table, said ROM-dependent area containing a routine list and a patch area for a substitute for one of said stored routines, said index table containing pointers to locations in said ROM-independent area and in said ROM-dependent area, said sequence table containing pointers to locations in said routine list, and said routine list containing pointers to locations in said ROM, said programming means including means for loading said calibration information selectively into said ROM-independent and ROM-dependent areas of said EEPROM in said engine control module.

15. The system of claim 14, wherein said loading means includes means for supplying a security handshake that changes for each of a plurality of secure messages.

16. The system of claim 15, wherein said loading means further includes means for initially installing a footprint into a nonvolatile memory in said engine control module, processing header records, and verifying the calibration file data in said engine control module with that in the service computer used for said loading means, said means for processing of header records including storing a calibration part number into an electronic data plate in said nonvolatile memory.

17. The system of claim 16, wherein said loading means further includes means for preliminarily verifying the presence of either a predetermined test pattern or a footprint from a prior loading operation in memory in said engine control module.

18. The system of claim 13, further comprising means for loading said calibration information into said engine control module, said loading means including means for supplying a security handshake that changes for each of a plurality of secure messages.

19. The system of claim 13, further comprising means for loading said calibration information into said engine control module, said loading means including means for initially installing a footprint into a nonvolatile memory in said engine control module, processing header records, and verifying the calibration file data in said engine control module with that in the service computer used for said loading means, said means for processing of header records including storing a calibration part number into an electronic data plate in said nonvolatile memory.

20. The system of claim 13, further comprising means for loading said calibration information into said engine control module, said loading means including means for preliminarily verifying the presence of either a predetermined test pattern or a footprint from a prior loading operation in memory in said engine control module.

21. A system for generating calibration information for an electronic engine control module, comprising:

means for defining a subfile type for each of a plurality of categories of engine calibration data;

means for creating a separate subfile in memory for each of a plurality of individual sets of data in each of said engine calibration data categories, said creating means including means for automatically verifying data entries based on rules stored in memory in a rules file, each of said subfile types having an associated rules file, each of said rules files defining criteria for individual data items and for interrelationships between data items in its associated subfile type;

means for creating a compatibility file in memory identifying subfiles of one type which are compatible with a subfile of another type;

means for distributing each subfile and said compatibility file individually via an electronic communication link to a plurality of service computers programmed to determine compatibility among selected subfiles based on information stored in said compatibility file and to assemble compatible subfiles into a calibration file for a particular engine control module;

means for generating calibration information for said particular engine control module from said calibration file; and means for programming an engine control module having a ROM containing multiple stored routines and an EEPROM divided into a ROM-independent area and a ROM-dependent area, said ROM-independent area containing an index table and a sequence table, said RC,M-dependent area containing a routine list and a patch area for a substitute for one of said stored routines, said index table containing pointers to locations in said ROM-independent area and in said ROM-dependent area, said sequence table containing pointers to locations in said routine list, and said routine list containing pointers to locations in said ROM, said programming means including means for loading said calibration information selectively into said ROM-independent and ROM-dependent areas of said EEPROM in said engine control module.

22. A system for generating calibration information for an electronic engine control module, comprising:

means for defining a subfile type for each of a plurality of categories of engine calibration data;

means for creating a separate subfile in memory for each of a plurality of individual sets of data in each of said engine calibration data categories, said creating means including means for automatically verifying data entries based on rules stored in memory in a rules file, each of said subfile types having an associated rules file, each of said rules files defining criteria for individual data items and for interrelationships between data items in its associated subfile type;

means for creating a compatibility file in memory identifying subfiles of one type which are compatible with a subfile of another type;

means for distributing each subfile and said compatibility file individually via an electronic communication link to a plurality of service computers programmed to determine compatibility among selected subfiles based on information stored in said compatibility file and to assemble compatible subfiles into a calibration file for a particular engine control module;

means for generating calibration information for said particular engine control module from said calibration file; and means for loading said calibration information into said engine control module, said loading means including means for supplying a security handshake that changes for each of a plurality of secure messages.

23. A system for calibrating an electronic engine control module, comprising:

a first computer, said first computer including means for receiving a separate subfile for each of plurality of individual a separate subfile for each of a plurality of engine calibration data categories, means for receiving a compatibility file identifying subfiles of one type which are compatible with a subfile of another type, means for assembling a calibration file from compatible subfiles based on information stored in said compatibility file, and means for attaching calibration loading instructions to said calibration file; and a service/recalibration tool located remote from said first computer, said service/recalibration tool including means for receiving said calibration file with attached calibration loading instructions from said first computer, and means for calibrating said electronic engine control module, said calibrating means including means for loading data from said calibration file in said service/recalibration tool into said electronic engine control module following said calibration loading instructions attached to said calibration file.

* * * * *

UNITED STATES PATENT AND TRADEMARK OFFICE
CERTIFICATE OF CORRECTION

PATENT NO. : 5,426,585

DATED : June 20, 1995

INVENTOR(S) : Mark R. Stepper et al.

It is certified that error appears in the above-identified patent and that said Letters Patent is hereby corrected as shown below:

In the Abstract, line 12, please change "base" to --based--.
In column 1, line 28, please change "tile" to --the--.
In column 2, line 10, please change "tile" to --the--.
In column 3, line 37, please insert --a-- after "into".
In column 3, line 46, please change "require" to --required--.
In column 3, line 66, please change "formal" to --format--.
In column 4, line 55, please insert --a-- after "at".
In column 4, line 66, please change "re]eases" to --releases--.
In column 6, line 19, please insert --*-- before "Save".
In column 6, line 26, please insert --*-- before "Update".
In column 6, line 32, please insert --*-- before "Compare".
In column 6, line 36, please change "So" to --do--.
In column 6, line 63, please change "tile" to --the--.
In column 8, line 38, please change "of" to --or--.
In column 10, line 5, please change "subline" to --subfile--.
In column 11, line 8, please change "a" to --and--.
In column 13, line 21, please change "RC,M" to --ROM--.
In column 14, line 25, please insert --a-- after "of".
In column 14, line 26, please change "a separate subfile for" to --sets of data in--.

Signed and Sealed this

Tenth Day of March, 1998

Attest:

Bruce Lehman

BRUCE LEHMAN

*Attesting Officer* *Commissioner of Patents and Trademarks*

US005426585B1

REEXAMINATION CERTIFICATE (4165th)

United States Patent [19]

Stepper et al.

[11] B1 5,426,585

[45] Certificate Issued Oct. 10, 2000

[54] METHOD AND APPARATUS FOR GENERATING CALIBRATION INFORMATION FOR AN ELECTRONIC ENGINE CONTROL MODULE

[75] Inventors: Mark R. Stepper, Columbus; Ernest F. Grube, Indianapolis; Gregory R. White, Columbus, all of Ind.; Vernon M. Faulkner, Tierra Verde, Fla.; Ronald B. Lannan, Columbus, Ind.; Ralph M. Weaver, Indianapolis, Ind.; Michele S. Roberts, Indianapolis, Ind.; Phillip E. Pash, Indianapolis, Ind.

[73] Assignee: Cummins Engine Company, Inc., Columbus, Ind.

Reexamination Request:
No. 90/005,258, Feb. 11, 1999

Reexamination Certificate for:

| | |
|---|---|
| Patent No.: | **5,426,585** |
| Issued: | **Jun. 20, 1995** |
| Appl. No.: | **07/890,652** |
| Filed: | **May 28, 1992** |

Certificate of Correction issued Mar. 10, 1998.

Related U.S. Application Data

[63] Continuation of application No. 07/677,142, Mar. 29, 1991, abandoned.

[51] Int. Cl.[7] .................... G06F 15/16

[52] U.S. Cl. .................... 702/85; 701/101; 707/200

[58] Field of Search .................... 702/85; 701/101; 707/200

[56] References Cited

U.S. PATENT DOCUMENTS

| | | | |
|---|---|---|---|
| 4,215,407 | 7/1980 | Gomola et al. | 364/468 |
| 4,389,706 | 6/1983 | Gomola et al. | 364/130 |
| 4,404,639 | 9/1983 | McGuire et al. . | |
| 4,493,303 | 1/1985 | Thompson et al. | 123/357 |
| 4,764,925 | 8/1988 | Grimes et al. | 371/20 |
| 4,831,539 | 5/1989 | Hagenbuch | 364/449 |
| 4,862,067 | 8/1989 | Brune et al. | 324/73 |
| 4,914,597 | 4/1990 | Moncelle et al. | 364/426.04 |
| 4,918,627 | 4/1990 | Garcia et al. | 364/552 |
| 4,947,355 | 8/1990 | Koeman . | |
| 5,251,151 | 10/1993 | Demjanenko et al. | 364/550 |
| 5,650,930 | 7/1997 | Hagenbuch | 364/421.07 |

OTHER PUBLICATIONS

"Automotive Electronics in the Year 2000," J. Rivard, SAE Technical Paper Series No. 861027, pp. 1–18. no date.

"Historical Perspective and Modern Developments," Printed from http://fondue.med.yale.edu/nadkarni/db_course/History_Contents.htm, May 19, 1999.

(List continued on next page.)

*Primary Examiner*—Kamini Shah

[57] ABSTRACT

A method and apparatus for generating calibration information in which a subfile type is defined for each of a plurality of categories of data including (1) engine control data, (2) engine family data, (3) vehicle interface data, (4) software sequencing data, (5) electronic configuration data, and (6) memory configuration data. A separate subfile is created in memory for each of a plurality of individual sets of data in each of the data categories. Each subfile is automatically provided with line checksums, a cyclic redundancy code, date information, a subfile type identifier, and a subfile authorization level, and data entries are automatically verified base on rules stored in memory in a rules file, each of the subfile types having an associated rules file, and each of the rules files defining criteria for individual data items and for interrelationships between data items in its associated subfile type. A compatibility file is created in memory to identify subfiles of one type which are compatible with a subfile of another type. Each subfile and the compatibility file are distributed individually via an electronic communication link to multiple service computers programmed to determine compatibility among selected subfiles based on information stored in the compatibility file and to assemble compatible subfiles into a calibration file for a particular engine control module.

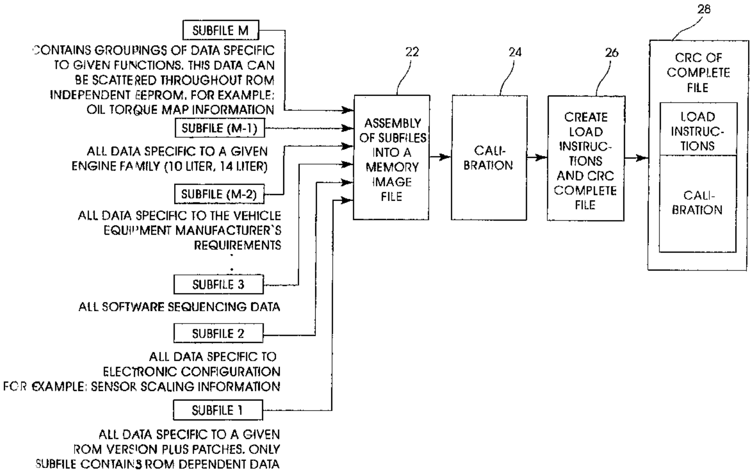

OTHER PUBLICATIONS

"File Organization and Data Management," Minkler, et al., *Annual Review of Information Science and Technology,* vol. 7, 1967, pp. 123–160.

"A Simple Guide To Five Normal Forms In Relational Database Theory," W. Kent, Communications of the ACM 26(2), Feb. 1983, pp. 120–125.

"Caterpillar 3406 PEEC (Programmable Electronic Engine Control)," M. Moncelle, et al., SAE Technical Paper No. 850173, Feb. 1985, pp. 1–14.

"DDEC II Advanced Electronic Diesel Control," R. Hames, et al., SAE Technical Paper No. 861110, Aug. 1986, pp. 1–9.

"Service and Support of Electronic Products in the Trucking Industry," J. Austin, et al., SAE Technical Paper No. 871579, Aug. 1987, pp. 1–9.

*Introduction ot Database Management—A Practical Approach,* G. Litton, William C. Brown Publishers, Dubuque, Iowa, 1987, pp. 224–239.

*Developing Data Structured Databases,* M. Brackett, Prentice–Hall, Inc., Englewood Cliffs, NJ, 1987, pp. 95–103.

"Cummins Electronic Controls For Heavy Duty Diesel Engines," R. Lannan, et al., IEEE88, 1988, pp. 289–306.

"New PACER 325 Rating Announced!!," News Release, Cummins Engine Company, Inc., Mar. 1990.

"Cummins Introduces New Heavy–Duty Diesel Engine Lines: Customer–Led Approach Is Foundation For Innovative Products," News Release, Cummins Engine Company, Inc., Mar. 28, 1990.

"Field Experience with the Detroit Diesel Electronic Control System," M. Bara, et al., SAE Technical Paper Series No. 901159, Oct. 1990, pp. 363–373.

*Modern Diesel Technology,* R. Brady, Prentice Hall, Englewood Cliffs, NJ, 1996, pp. 108–194.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *